(12) United States Patent
Orth

(10) Patent No.: US 8,363,580 B2
(45) Date of Patent: Jan. 29, 2013

(54) DISPARATE RADIOS IN A WIRELESS MESH NETWORK

(75) Inventor: Kelly Michael Orth, Apple Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 680 days.

(21) Appl. No.: 12/384,012

(22) Filed: Mar. 31, 2009

(65) Prior Publication Data

US 2010/0246542 A1    Sep. 30, 2010

(51) Int. Cl.
*H04W 4/00*    (2009.01)
(52) U.S. Cl. .................... 370/310.2; 370/328
(58) Field of Classification Search .............. 370/310, 370/310.2, 312, 318, 328, 334, 338, 349
See application file for complete search history.

(56) References Cited

U.S. PATENT DOCUMENTS

| | | | |
|---|---|---|---|
| 7,224,642 B1 | 5/2007 | Tran | |
| 7,495,078 B2 * | 2/2009 | Brady et al. ................... | 530/351 |
| 2002/0065631 A1 | 5/2002 | Loechner | |
| 2002/0167954 A1 | 11/2002 | Highsmith et al. | |
| 2004/0259554 A1 | 12/2004 | Rappaport et al. | |
| 2005/0074019 A1 | 4/2005 | Handforth et al. | |
| 2005/0124346 A1 | 6/2005 | Corbett et al. | |
| 2005/0192037 A1 | 9/2005 | Nanda et al. | |
| 2005/0193357 A1 | 9/2005 | Honary et al. | |
| 2005/0201349 A1 | 9/2005 | Budampati | |
| 2005/0223110 A1 | 10/2005 | Honary et al. | |
| 2005/0238058 A1 | 10/2005 | Pierce, Jr. et al. | |
| 2005/0281215 A1 | 12/2005 | Budampati et al. | |
| 2006/0002368 A1 | 1/2006 | Budampati et al. | |
| 2006/0064477 A1 | 3/2006 | Renkis | |
| 2006/0095539 A1 | 5/2006 | Renkis | |
| 2006/0111040 A1 | 5/2006 | Jenkins et al. | |
| 2006/0146874 A1 | 7/2006 | Yuan et al. | |
| 2006/0164320 A1 | 7/2006 | Lastinger et al. | |
| 2006/0215582 A1 | 9/2006 | Castagnoli et al. | |
| 2006/0215627 A1 | 9/2006 | Waxman | |
| 2006/0221949 A1 | 10/2006 | Anjum | |
| 2006/0227729 A1 | 10/2006 | Budampati et al. | |
| 2006/0268791 A1 | 11/2006 | Cheng et al. | |
| 2006/0274644 A1 | 12/2006 | Budampati et al. | |
| 2006/0274671 A1 | 12/2006 | Budampati et al. | |
| 2006/0287001 A1 | 12/2006 | Budampati et al. | |
| 2007/0010196 A1 | 1/2007 | Periyalwar et al. | |

(Continued)

FOREIGN PATENT DOCUMENTS

| | | | |
|---|---|---|---|
| DE | 102005059875 A1 * | 6/2007 | |
| WO | 03 023536 A1 | 3/2003 | |

OTHER PUBLICATIONS

Official Search Report and Written Opinion of the Patent Cooperation Treaty Office in counterpart foreign Application No. PCT/US2010/000967, filed Mar. 31, 2010.

*Primary Examiner* — Brenda H Pham
(74) *Attorney, Agent, or Firm* — Kinney & Lange, P.A.

(57) ABSTRACT

A wireless mesh network that makes use of strategically placed nodes with radios having superior communication range through the use of high gain antennas, MIMO technology, high power transmitters, high sensitivity receivers, a combination thereof, etc. Besides the obvious effect of extending the physical coverage area of a network, the effect of the longer distance links formed by the nodes with superior range is a flattening of the wireless mesh network by reducing hop count, thereby improving performance, latency, reliability, cost, and power consumption among other factors.

20 Claims, 7 Drawing Sheets

U.S. PATENT DOCUMENTS

| | | |
|---|---|---|
| 2007/0030816 A1 | 2/2007 | Kolavennu |
| 2007/0030832 A1 | 2/2007 | Gonia et al. |
| 2007/0053295 A1 | 3/2007 | Cleveland et al. |
| 2007/0147255 A1 | 6/2007 | Oyman |
| 2007/0153817 A1 | 7/2007 | Osann |
| 2007/0160020 A1 | 7/2007 | Osann |
| 2007/0183439 A1 | 8/2007 | Osann, Jr. |
| 2007/0206503 A1 | 9/2007 | Gong et al. |
| 2007/0206547 A1 | 9/2007 | Gong et al. |
| 2007/0223310 A1 | 9/2007 | Tran |
| 2007/0230403 A1 | 10/2007 | Douglas et al. |
| 2007/0297366 A1 | 12/2007 | Osann |
| 2008/0080364 A1 | 4/2008 | Barak et al. |
| 2008/0189394 A1 | 8/2008 | Ross et al. |

* cited by examiner

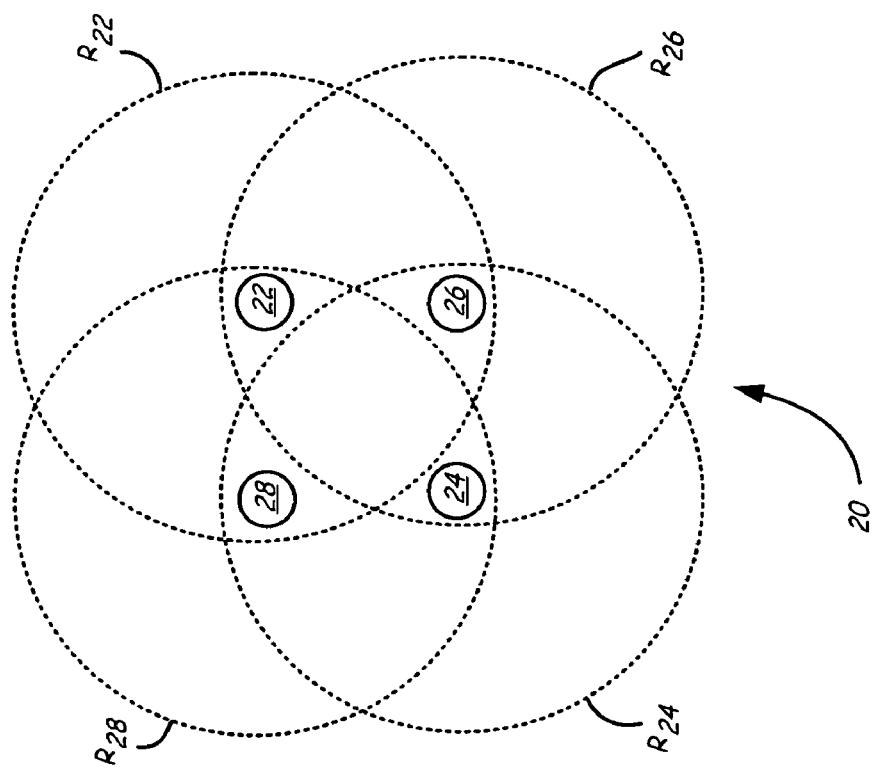
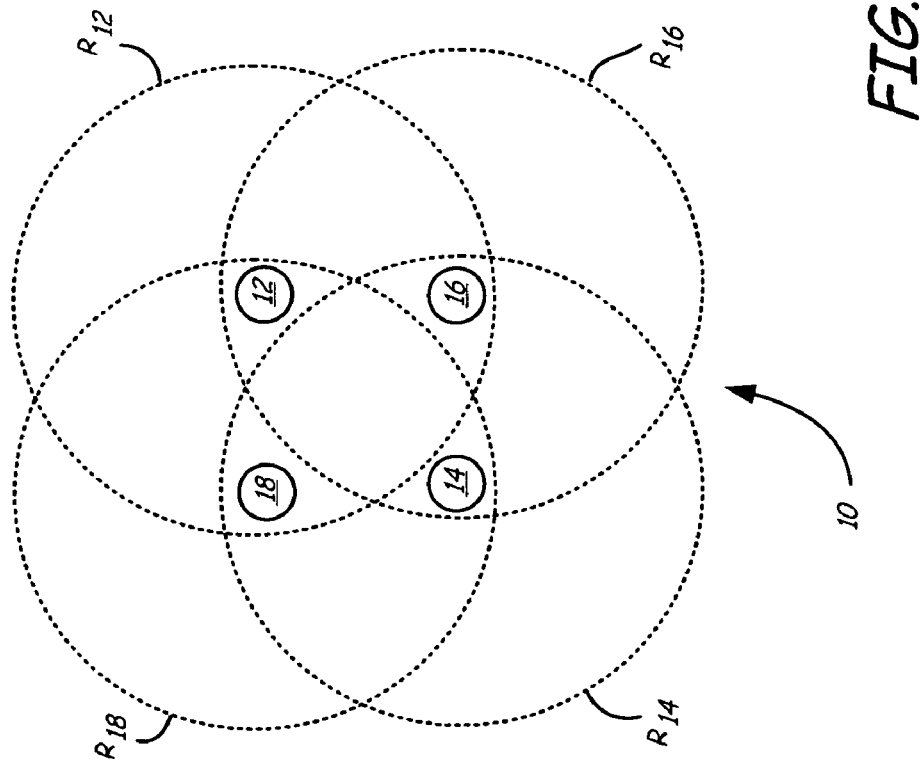
FIG. 1

DISPARATE RADIOS IN A WIRELESS MESH NETWORK

BACKGROUND

The present invention relates to wireless mesh network systems. In particular, the invention relates to wireless mesh network systems having an improved performance through the use of selected nodes with different communication characteristics.

In many industrial settings, control systems are used to monitor and control inventories, processes, and the like. Often, such control systems have a centralized control room with a host computer that communicates with field devices that are separated or geographically removed from the control room.

Generally, each field device includes a transducer, which may generate an output signal based on a physical input or generate a physical output based on an input signal. Types of transducers used in field devices include various analytical equipment, pressure sensors, thermistors, thermocouples, strain gauges, flow sensors, positioners, actuators, solenoids, indicators, and the like. Traditionally, analog field devices have been connected to the process subsystem and the control room by two-wire twisted-pair current loops, with each device connected to the control room by a single two-wire twisted pair loop. Typically, a voltage differential is maintained between the two wires of approximately 20 to 25 volts, and a current between 4 and 20 milliamps (mA) runs through the loop. An analog field device transmits a signal to the control room by modulating the current running through the current loop to a current proportional to the sensed process variable. An analog field device that performs an action under the control of the control room is controlled by the magnitude of the current through the loop, which is modulated by the ports of the process subsystem under the control of the controller.

While historically field devices were capable of performing only one function, more recently hybrid systems that superimpose digital data on the current loop have been used in distributed control systems. The Highway Addressable Remote Transducer (HART) protocol superimposes a digital carrier signal on the current loop signal. The digital carrier signal can be used to send secondary and diagnostic information. Examples of information provided over the carrier signal include primary and secondary process variables, diagnostic information (such as sensor diagnostics, device diagnostics, wiring diagnostics, process diagnostics, and the like), operating temperatures, sensor temperature, calibration data, device ID numbers, configuration information, and so on. Accordingly, a single field device may have a variety of input and output variables and may implement a variety of functions.

Another approach uses a digital communication bus to connect multiple field devices to the host in the control room. Examples of digital communication protocols used with field devices connected to a digital bus include Foundation Fieldbus, Profibus, Modbus, and DeviceNet. Two way digital communication of messages between a host computer and multiple field devices can be provided over the same two-wire path that supplies power to the field devices.

Typically, remote applications have been added to a control system by running very long homerun cables from the control room to the remote application. If the remote application is, for example, a half of a mile away, the costs involved in running such a long cable can be high. If multiple homerun cables have to be run to the remote application, the costs become even higher. Wireless communication offers a desirable alternative, and wireless mesh networks have been proposed for use in industrial process control systems. However, to minimize costs, it is also desirable to maintain existing control systems and communication protocols, to reduce the costs associated with changing existing systems to accommodate the wireless communication.

In wireless mesh network systems designed for low power sensor/actuator based applications, many devices in the network must be powered by long life batteries or by low power energy scavenging power sources. Power outlets, such as 120 VAC utilities, are not typically located nearby or may not be permitted into the hazardous locations where the instrumentation (sensors and actuators) must be located without incurring significant installation expense. The economic need for low installation cost drives the need for battery powered devices communicating as part of a wireless mesh network. Effective utilization of a limited power source, such as a primary cell battery which cannot be recharged, is vital for a properly functioning wireless device. Batteries are expected to last more than 5 years and preferably as long as the life of the product.

In a true wireless mesh network, each device must be capable of routing messages for itself as well as other devices in the mesh network (so called mesh to the edge). The concept of messages hopping from radio to radio through the network is beneficial because lower power radios can be used and yet the mesh network can span a significant physical area delivering messages from one end to the other. High power radios are not needed as in a point-to-point system which employs remote devices talking directly to a distant centralized base station.

A mesh network allows for the formation of alternate paths for messaging between devices and between devices and a data collector or a bridge or gateway to some higher level higher speed data bus. Having alternate redundant paths for messages enhances data reliability by ensuring there is at least one path for messages to use even if another path becomes blocked or degraded due to environmental influences or interference.

Some mesh network protocols are deterministically routed such that every node has an assigned parent and at least one alternate parent. In the hierarchy of the mesh network, much as in a human family, parents have children, children have grandchildren, and so on. Each node relays the messages for their descendants through the network to some final destination such as a gateway. The parenting nodes may be battery-powered or limited-energy powered devices. The more descendants a node has, the more traffic it must route, which in turn directly increases its own power consumption and diminishes its battery life.

Normally, all nodes in the mesh network employ radios (RF transceivers) of the same quality each having the same link budget (Tx power-Rx sensitivity). To bridge long distances, many nodes are sometimes required to relay messages. In an industrial setting, it may be physically impossible or environmentally prohibited to install radios in certain locations to make these links. An improved method for using wireless mesh networks in an industrial setting is needed.

SUMMARY

A wireless mesh network includes a first plurality of nodes including radios having a first communication range and a second plurality of nodes with including radios having a second, different communication range. The first and second plurality of nodes are capable of communicating with any other node within their communication range.

BRIEF DESCRIPTION OF THE DRAWINGS

FIG. 1 is a diagram showing a conventional mesh network with two clusters of nodes.

DETAILED DESCRIPTION

Figure 2:
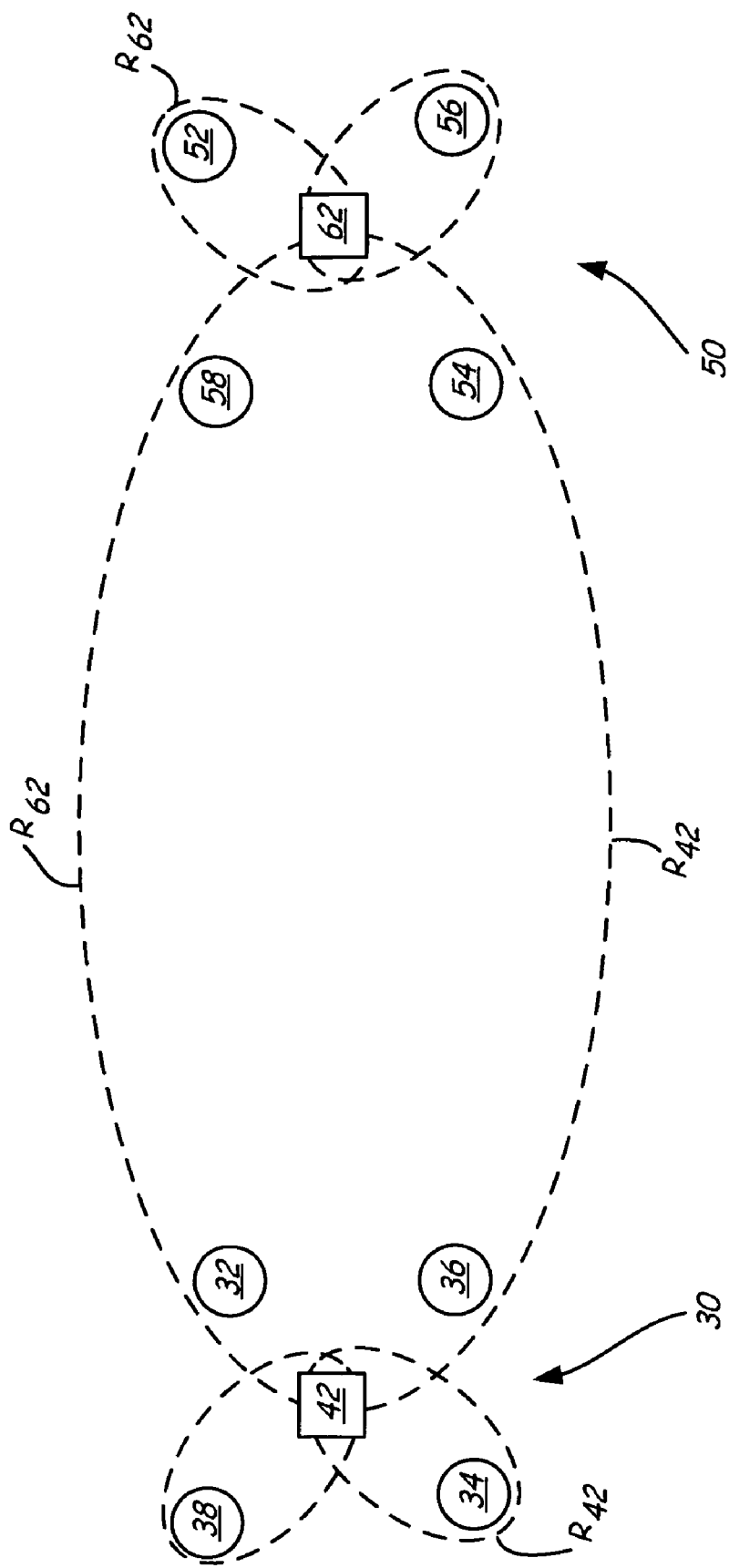
FIG. 2 is a diagram showing a wireless mesh network with two clusters of nodes interlinked by nodes with radios utilizing higher gain Yagi antennas.

The present invention provides a method for constructing mesh networks for field devices where conventional techniques would require additional nodes or would not exhibit the required connectivity for a mesh network to operate. A node includes at least one radio and one field device, though it may have several of each. Many nodes are installed in a fixed location where its corresponding field device is designed to operate. When there is a control room adapted to operate with the field devices, the control room is capable of communicating with at least one node such that it is operable over the mesh network.

For a mesh network to function properly, full connectivity to all the nodes is needed so that data to/from all of the field devices is available. It is not always possible to install additional nodes to relay communications from remote nodes in the industrial setting because it may be impossible or environmentally prohibited to place them there. By introducing superior nodes with increased communication range or specialized antennas, obstacles which would prevent connectivity are overcome.

Previous designs with high power radio nodes were used in a hierarchy where a local node would transmit to a high power radio node which would then communicate with another high power radio node that would finally deliver the message to another local node. The high power radio nodes would typically use a different protocol or even a different communications medium. This multi-tiered network requires more hops to transmit a message as it must be transmitted from the lower level to a higher level, across the higher level and then back down from the higher level to the lower level. In a flat network, there are no tiers and no required hierarchy. Each node can communicate directly with any other node within the range of its radio. Performance is better because there are fewer hops resulting in lower latency, higher reliability, and lower power consumption.

Traditionally, so called flat networks employed only nodes with the same link budget. To span a distance, multiple nodes would be positioned to relay the message. The other alternative was to employ selected higher power radio nodes on a multi-tiered hierarchical system. The present invention allows a high power radio node to communicate with any other node in range. The resulting network is flat and includes the superior radio nodes needed to provide full network connectivity in an industrial setting.

FIG. 1 illustrates nodes as they may be installed in an industrial setting clustered around a piece of equipment or a location where environmental readings are taken. Cluster 10 has omni-directional radio nodes 12, 14, 16, and 18 with ranges $R_{12}$, $R_{14}$, $R_{16}$, and $R_{18}$ respectively. Similarly, cluster 20 has omni-directional radio nodes 22, 24, 26, and 28 with ranges $R_{22}$, $R_{24}$, $R_{26}$, and $R_{28}$. A node can complete a transmission to any other node within its range. Node 12 can send transmissions to nodes 16, and 18; node 14 can send to nodes 16 and 18, etc. No direct link exists between nodes 12 and 14. Messages sent between these nodes are routed through other nodes. For example, a message from node 12 to node 14 could first go from node 12 to node 16 then to node 14 or it could go from node 12 to node 18 to node 14. A message hops each time it is relayed through another node. Latency is directly related to the number of hops required to complete a transmission. This network suffers from the problem that there is no way to send messages between clusters 10 and 20 as there are no nodes between the networks to relay messages. In an industrial setting, it may not be possible to install nodes in the intermediate locations. There are a variety of reasons why this may be the case. It may be physically impossible to locate a functioning radio there, it may be a sensitive/hazardous area where installing a permissible node is cost prohibitive, or the owner of the system may not have the land rights between locations, etc.

FIG. 2 shows a wireless mesh network containing cluster 30 of onmi-directional radio nodes 32, 34, 36, and 38 and cluster 50 of omni-directional radio nodes 52, 54, 56, and 58 where clusters 30 and 50 are arranged similarly to the network of FIG. 1. This mesh network additionally includes node 42 in cluster 30 and node 62 in cluster 50 utilizing radios with Yagi antennas which have coverage areas $R_{42}$ and $R_{62}$ respectively. A small 2.4 GHz Yagi antenna measuring 4.5" long and 3.5" in diameter can provide 10 dBi forward gain and 55 degree beam width versus only 2.1 dBi gain for a standard dipole (360 degree omni-directional) antenna.

Figure 3:
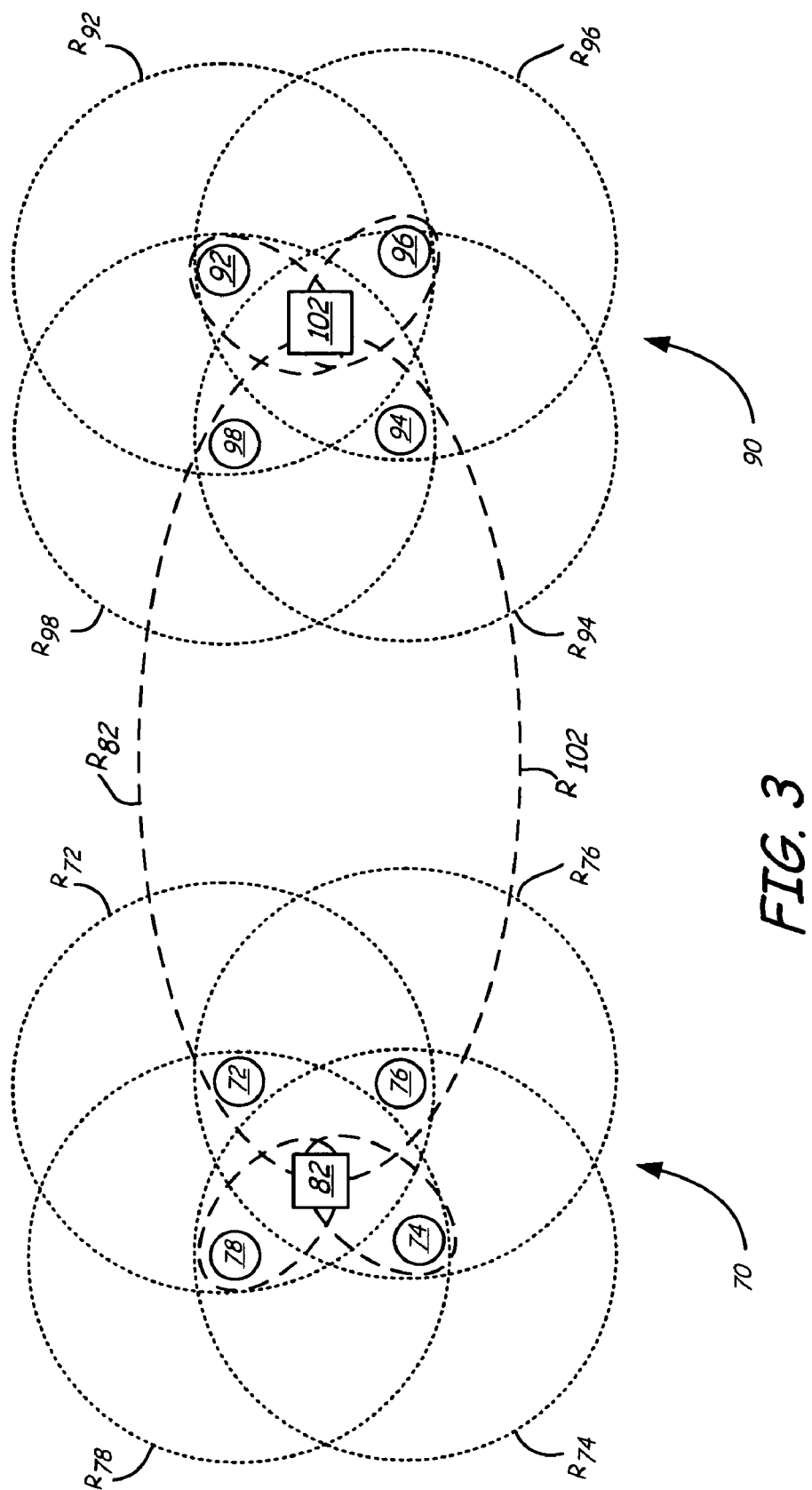
FIG. 3 is a diagram showing a wireless mesh network with two clusters of nodes interlinked by nodes with radios that have higher gain Yagi antennas.

FIG. 3 shows this network with all ranges illustrated. The antenna selection and placement of the nodes allows at least one path for every necessary transmission. For example, a message can be sent from node 72 to node 98 by hopping from node 72 to node 82 to node 102 to node 98. A return path for a reply message can follow this same path in reverse. If two nodes can communicate in one direction they can communicate in the opposite direction by the principle of reciprocity.

The network is also functional if a different return path is used to enable bi-directional communication. For example, the message can be sent from node 98 to node 72 by hopping from node 98 to node 94 to node 102 to node 82 to node 72.

The strategic placement and use of these high gain antennas increases the link budget for those nodes and allows them to achieve a longer range connection without having to place several additional nodes between cluster 70 and cluster 90. A variety of different types of antennas can be used based on the physical environment where the mesh network is installed. This arrangement is particularly useful when the location prevents the installation of additional nodes.

In the example shown in FIG. 3, there are three ranges to consider. The Yagi-Yagi range between two nodes with Yagi antennas is greater than the Yagi-Omni range between a node with a Yagi antenna and one with a 2 dBi standard dipole omni-directional antenna. In turn, the Yagi-Omni range is greater than the omni-omni range between two nodes with 2 dBi standard dipole omni-directional antennas.

Figure 3A:
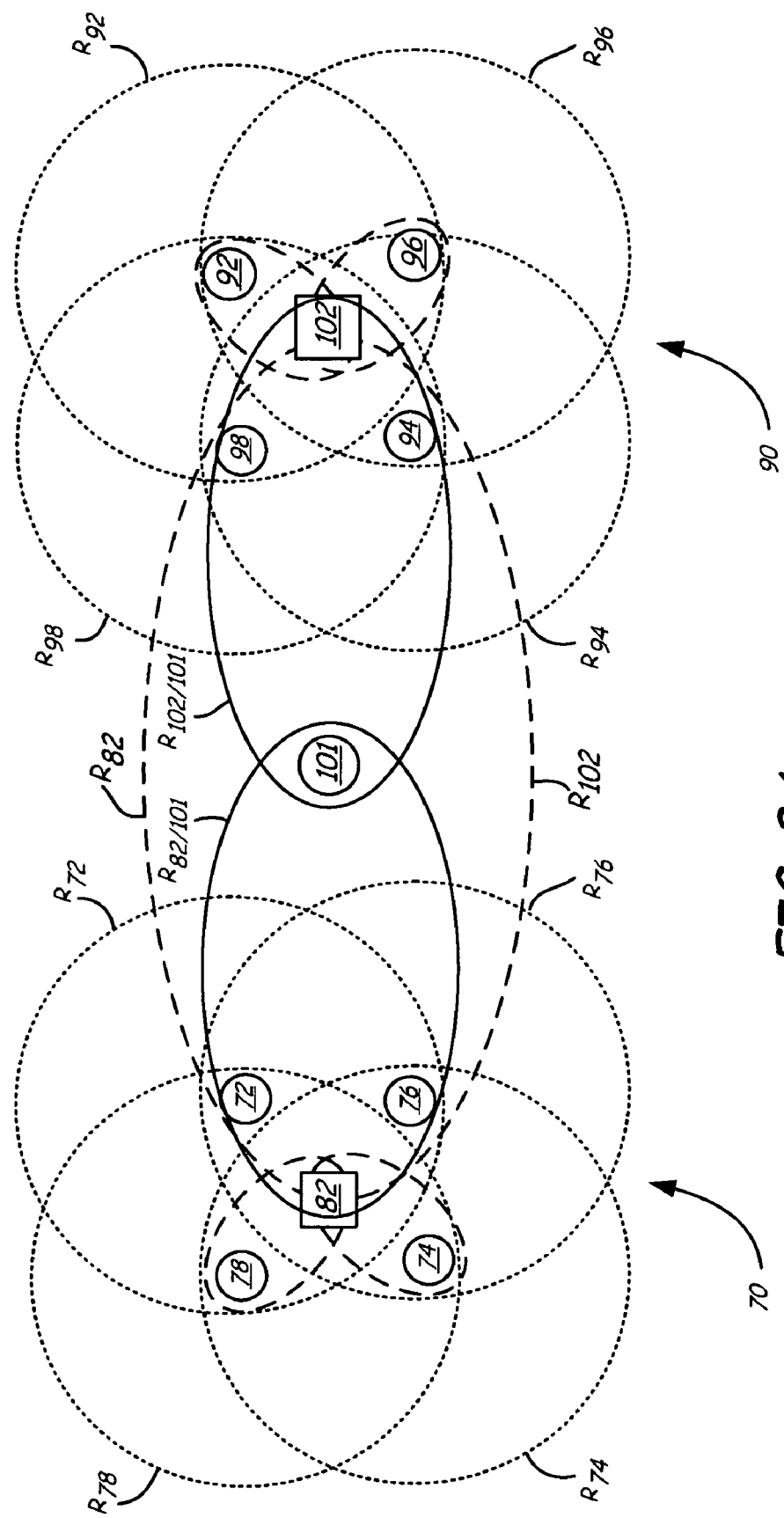
FIG. 3A is a diagram of a wireless mesh network, similar to the network of FIG. 3, that further includes a node intermediate the two clusters.

FIG. 3A illustrates these three different ranges. The wireless mesh network shown in FIG. 3A is similar to the network shown in FIG. 3, except for the addition of node 101 positioned intermediate clusters 70 and 90. Node 101 is an omni-directional radio node which, in this example, is positioned far enough from both clusters 70 and 90 that the Omni-Omni antenna range is not large enough to permit direct communication between node 101 and any of the omni-directional nodes 72, 74, 76, 78 of cluster 70 or 92, 94, 96, 98 of cluster 90.

Yagi-Omni range $R_{82/101}$ of the combination of nodes 82 and 101 is sufficient to provide a link between cluster 70 and node 101. Similarly, Yagi-Omni range $R_{102/101}$, of the combination of nodes 102 and 101 is sufficient to provide a link between cluster 90 and 101. The Yagi-Yagi range of the combination of nodes 82 and 102 is greater than the Yagi-omni ranges, and can provide a direct link between clusters 70 and 90.

Figure 4:
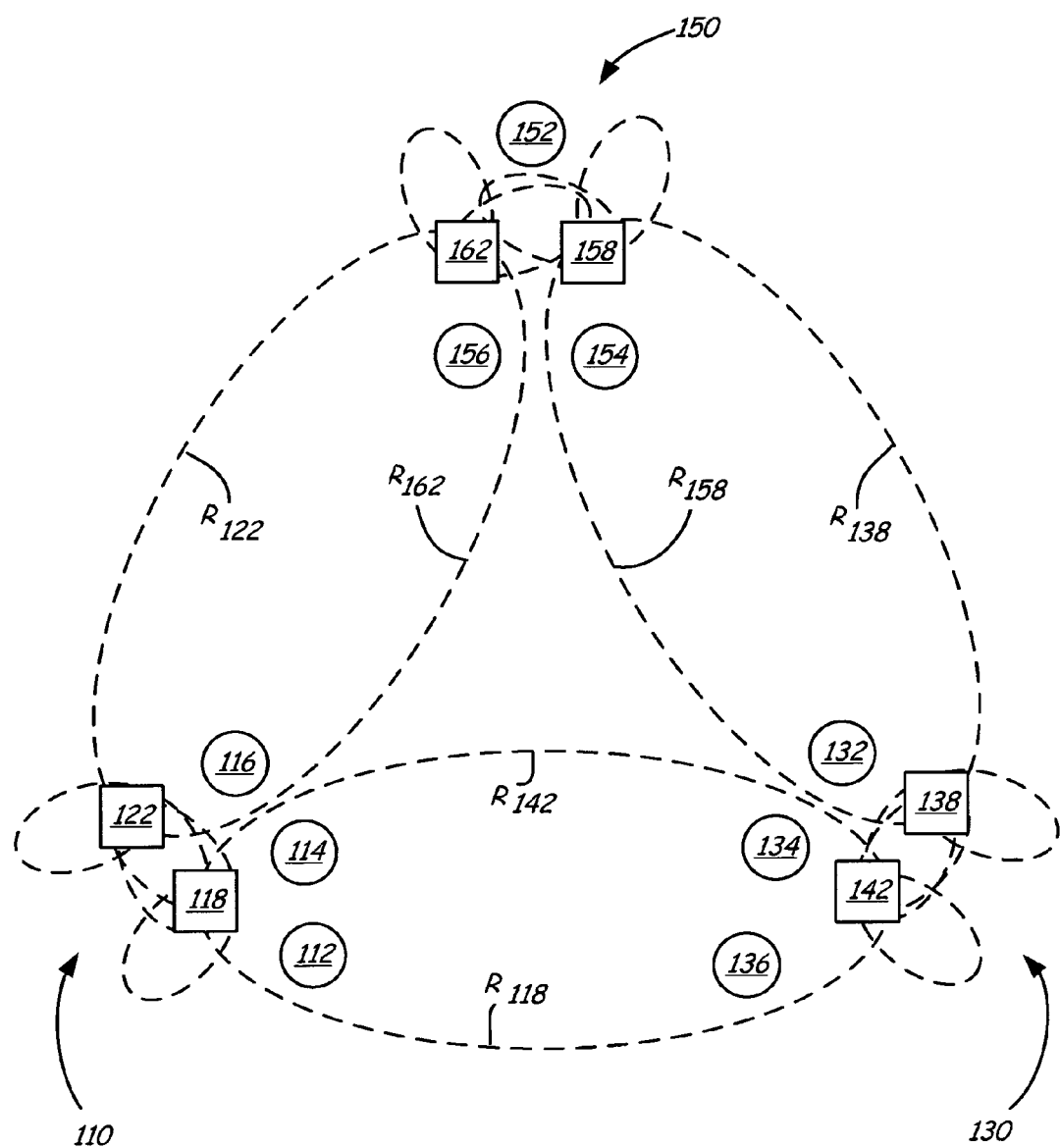
FIG. 4 is a diagram showing a wireless mesh network with three clusters of nodes redundantly connected together with nodes that have radios with higher gain Yagi antennas.

FIG. 4 shows a wireless mesh network with node clusters 110, 130, and 150 which are redundantly connected together with Yagi antenna equipped nodes 118, 122, 138, 142, 158, and 162. The range lines for omni-directional radio nodes 112, 114, 116, 132, 134, 136, 152, 154, and 156 have been omitted. Each node has a sufficient gain to transmit to the other nodes within its cluster but not between clusters. If interference or noise were to break one of the links connecting clusters 110 and 130, for example between nodes 118 and 142, full connectivity of the network would remain. When something such as interference prevents a direct link between nodes 118 and 142, a message can be sent by hopping from node 118 to node 112 to node 116 to node 122 to node 162 to node 156 to node 154 to node 158 to node 138 to node 132 to node 134 to node 142.

Yagi antennas are very directional, so they must be pointed to communicate in the desired direction. Node 122, is not pointed at node 112 so they cannot communicate directly. Nodes 122 and 156 have an intermediate range since they form a Yagi-Omni link. They may or may not be in direct communication with each other. Node 158 is not pointed at node 156, so they cannot communicate directly. Node 142 is not pointed at node 132, so they cannot communicate directly.

Figure 5:
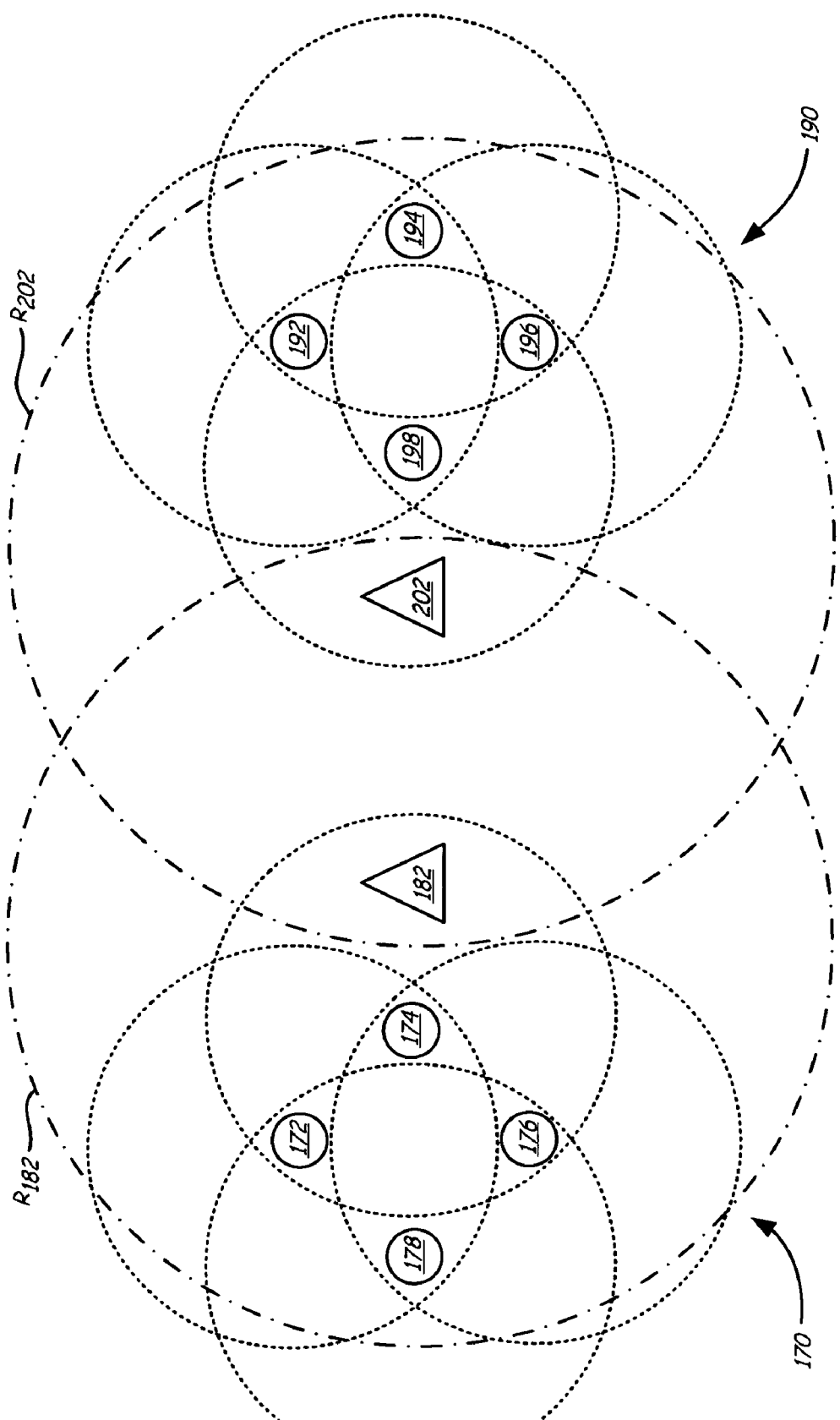
FIG. 5 is a diagram showing a wireless mesh network including nodes with higher range radios.

FIG. 5 shows a wireless mesh network with high range radio node 182 with coverage area $R_{182}$ in cluster 170 and high range radio node 202 with coverage area $R_{202}$ in cluster 190. The range of nodes 182 and 202 can be increased in a number of ways. One method is to install a radio with a higher power transmitter and a more sensitive receiver to achieve a higher link budget. Another method is to use technology such as MIMO to increase the range. MIMO technology creates a higher link budget by providing gain through spatial diversity. The same signal is transmitted using two or more transmitters at the same time from one radio and correlating the signals received on two or more separate receivers in another radio. True MIMO technology has multiple receivers and multiple transmitters including multiple antennas at both ends of the link. However, not all nodes need to be upgraded to MIMO technology to obtain a benefit.

Figure 6:
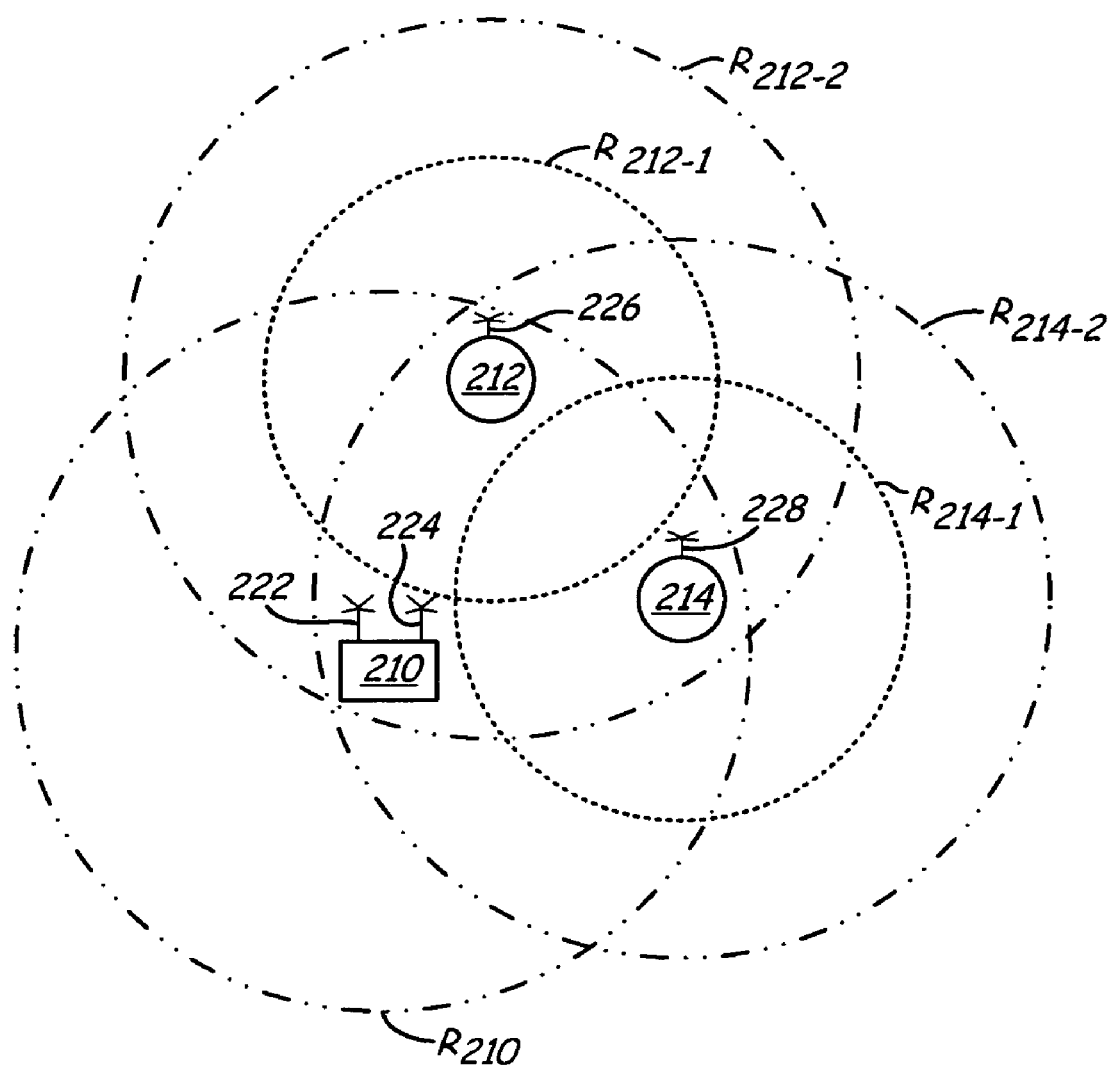
FIG. 6 is a diagram showing a wireless mesh network including a longer distance link formed by nodes including a pair of transceivers at one end and a single transceiver at the other end.

A simpler method shown in FIG. 6 uses multiple transceivers in node 210 (antennas 222 and 224) and a single transceiver in other nodes 212 (antenna 226) and 214 (antenna 228). This arrangement provides significant benefits to signal strength. When multiple transceiver node 210 receives a signal, it does so using separate receivers on separate antennas. Because the antennas are separated from each other, the signal transmitted from the sending node has a slightly different path to each antenna. Due to variation in path loss, node 210 can pick which receiver has received the signal with the best quality. When sending a signal, node 210 can then choose the best antenna to use which then has the best path to transmit a signal back to the original sending node. In effect, the improved reception increases the range of node 212 from $R_{212-1}$ to $R_{212-2}$ and from $R_{214-1}$ to $R_{214-2}$ for radio 214. The improvements also greater range $R_{210}$ for node 210 due to the ability to select the best path at any time. This technique achieves gain through signal and path selectivity.

Conventional mesh networks consist of nodes that are all of the same quality with the same link budget. The present invention describes mesh networks where some nodes have superior radios or superior antennas. Latency is reduced because messages can be transmitted using fewer hops. This improves the performance of the mesh network. Higher link budgets can be achieved by using varying antenna designs, for examples 10 dBi YAGI vs. 2 dBi dipole, using transmitters of higher power, for example +15 dBm vs. 0 dBm, using receivers of higher sensitivity, for example −110 dBm vs. −90 dBm, or a combination of the above. Directional antennas other than Yagi antennas, such as sector antennas or parbolic antennas, may also be used.

Although the present invention has been described with reference to preferred embodiments, workers skilled in the art will recognize that changes may be made in form and detail without departing from the spirit and scope of the invention.

The invention claimed is:

1. A wireless mesh network comprising:
    a plurality of first nodes, each first node including a field device and a radio having a first communication range; and
    a second node including a field device and a radio having a second communication range, wherein the second communication range is greater than the first communication range;
    wherein the plurality of first nodes and the second node are configured to communicate with any other node of the wireless mesh network within their communication range.

2. The wireless mesh network of claim 1, further comprising a plurality of second nodes interspersed among the plurality of first nodes.

3. The wireless mesh network of claim 1, wherein the radios of the first nodes have omni-directional antennas.

4. The wireless mesh network of claim 1, wherein the radio of the second node includes a directional antenna.

5. The wireless mesh network of claim 1, wherein the radio of the second node has higher power transmitter and more sensitive receiver than the radios of the nodes of the first set.

6. The wireless mesh network of claim 1, further comprising a control room configured to communicate with at least one of the first and second nodes.

7. The wireless mesh network of claim 1, wherein at least one node includes a plurality of field devices.

8. The wireless mesh network of claim 1, wherein the radio of the second node uses MIMO technology.

9. The wireless mesh network of claim 8, wherein the radio of the second node includes two transceivers.

10. The wireless mesh network of claim 8, wherein the MIMO technology uses a different number of transmitters and receivers.

11. A wireless mesh network comprising:
    a first cluster of nodes, each node including a field device and a radio having a link budget capable of communicating with other nodes in the first cluster, and at least one higher link budget node including a radio having a higher link budget radio capable of communicating with nodes not in the first cluster; and a second cluster of nodes, each node including a field device and a radio having a link budget capable of communicating with other nodes in the second cluster;

wherein the higher link budget node of the first cluster is capable of forming a wireless link between the first and second clusters.

12. The wireless network of claim 11, wherein the second cluster of nodes includes at least one higher link budget node including a radio having a higher link budget radio capable of communicating with nodes not in the second cluster, and wherein the higher link budget node of the second cluster is capable of forming a wireless link between the first and second clusters.

13. The wireless mesh network of claim 11, wherein the higher link budget radio uses at least one of the following: MIMO technology, a high gain antenna, a directional antenna, or a high power transmitter with a high sensitivity receiver.

14. The wireless mesh network of claim 11, wherein the first cluster includes a plurality of nodes including higher link budget radios.

15. The wireless mesh network of claim 11, wherein the second cluster includes a plurality of nodes including higher link budget radios.

16. The wireless mesh network of claim 11, wherein at least one field device is mounted in a fixed location.

17. The wireless mesh network of claim 11, wherein the network further comprises a control room configured to communicate with the first and second clusters.

18. The wireless mesh network of claim 11, wherein at least one node includes a plurality of field devices.

19. A wireless mesh network comprising a plurality of clusters of nodes wherein each node is associated with a field device and a radio having a link budget capable of communicating with other nodes in its cluster and each cluster includes at least one node that includes a radio having a higher link budget capable of establishing a link to a node in another cluster so that the clusters are interconnected.

20. The wireless mesh network of claim 19, wherein the radios comprise a combination of omni-directional radios, MIMO technology radios, high gain antenna radios, or radios with high power transmitter and high sensitivity receiver.

* * * * *

UNITED STATES PATENT AND TRADEMARK OFFICE
CERTIFICATE OF CORRECTION

PATENT NO. : 8,363,580 B2  Page 1 of 1
APPLICATION NO. : 12/384012
DATED : January 29, 2013
INVENTOR(S) : Kelly Michael Orth It is certified that error appears in the above-identified patent and that said Letters Patent is hereby corrected as shown below:

In the Specification

Col. 2, Lines 11-12
  Delete "120 VAC"
  Insert --120VAC--

Col. 4, Line 33
  Delete "onmi-directional"
  Insert --omni-directional--

Col. 6, Line 8
  Insert --provide-- before "greater range"

Signed and Sealed this
Tenth Day of December, 2013

Margaret A. Focarino
*Commissioner for Patents of the United States Patent and Trademark Office*